United States Patent Office 3,629,229
Patented Dec. 21, 1971

3,629,229
WATER SOLUBLE BASIC ALUMINUM POLY-
HYDROXYL HYDROCARBON COMPLEXES
Horst W. Schmank, Ringgold, Ga., assignor to Chattem
Chemicals, Division of Chattem Drug & Chemical
Company, Chattanooga, Tenn.
No Drawing. Filed Feb. 27, 1969, Ser. No. 803,119
Int. Cl. C07c 47/18
U.S. Cl. 260—209 R                                    7 Claims

ABSTRACT OF THE DISCLOSURE

This invention relates to water soluble aluminum-polyhydroxyl hydrocarbon complexes in which a cationic moiety is loosely bonded to the reaction product between aluminum hydroxide and a polyhydroxyl hydrocarbon such as a sugar.

The compositions of the present invention are particularly useful as soluble antacids, as textile treating agents, as intermediates for the preparation of other aluminum compounds, as gelling agents, water purifiers and paint and ink additives.

BACKGROUND OF THE INVENTION

Field of the invention

This invention is in the field of organic aluminum compounds having substantial water solubility and including a cationic moiety which is loosely bonded to the condensation product between aluminum hydroxide and a water soluble polyhydroxy hydrocarbon.

Description of the prior art

There are some references in the literature and in patents to the inclusion of polyhydroxyl compounds along with aluminum hydroxide. For example, the article by Sato in the Journal of Applied Chemistry (London), vol. 9, pages 50 to 58 (1959) describes the prevention of precipitation of aluminum hydroxide from sodium aluminate solutions with hydragillite in the presence of glucose, sugar and starch.

An article by Iveokovic (Croat. Chem. Acta), vol. 28, pages 101 to 105 (1956) describes the use of glycols to prevent the precipitation of aluminum hydroxide from sodium aluminate.

Belgian Pat. No. 616,514 describes certain aluminum polyhydroxyl hydrocarbons containing 3 or more aluminum atoms for every molecule of polyol.

The article by Hinkel (J. Am. Pharm. Assoc.), page 380, July 1959 describes the use of an aluminum cationic carbonate hexitol complex to increase the reactivity of aluminum hydroxide as an antacid.

Alford U.S. Pat. No. 2,999,790 describes the use of small amounts of hexitol, mannitol or sorbitol to stabilize aluminum hydroxide antacids of the gel type. Yet, all complexes heretofore described are water insoluble, rather than the water soluble complexes described in this invention.

SUMMARY OF THE INVENTION

The compounds of the present invention are water soluble aluminum-polyhydroxyl hydrocarbon complexes having the formula:

$$A_n + [(Al(OH)_3)_x R(OH)_y]$$

Where A is a cationic moiety, $R(OH)_y$ is a water soluble polyhydroxyl hydrocarbon, $x$ has a value of from 0.1 up to $y$, $y$ is the hydroxyl on the hydrocarbon and is an integer of at least 2, and $n$ is from 0.1 to 2. The plus sign appearing between the cationic moiety A and the remainder of the molecule indicates that the two are loosely held together. Many of these materials exist as hydrates but since the number of molecules of water of hydration is rather indefinite in these compounds, they do not appear in the formula given above.

The method involved in the preparation of these new complexes is relatively straightforward. First, a solution of a base and a water soluble polyhydroxyl hydrocarbon is provided, to which there is added a source of aluminum. The source of aluminum is added by increments to control the reaction, if necessary.

It is also possible to use basic aluminum compounds in the first instance, in which case the dissolution of the basic aluminum compound itself provides the basic solution and other bases are not required.

DESCRIPTION OF THE PREFERRED EMBODIMENTS

The complexes of the present invention are believed to have the following type of structure:

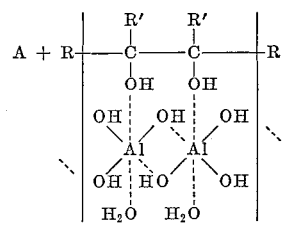

The bonding between the hydroxyl groups and the aluminum or carbon atoms exemplified by the solid line refers to true valent bonds and those shown by the dotted lines represent hydrogen bonding or covalent bonds.

The R referred to in the foregoing structural formula consists of one or more hydrogens or organic groups, and both R's can be part of a cyclic configuration. While these specific structural formulae indicate that the hydroxyl groups on the polyhydroxyl organic compound are on adjacent carbon atoms, this need not always be the case, particularly in the use of relatively high molecular weight polyglycols. In the case of ethylene glycol as a starting material, the two R's represent hydrogen atoms. The R' represents hydrogen or alkyl groups from 1 to 8 carbon atoms.

The choice of a specific polyhydroxyl organic compound for use in accordance with the present invention depends, of course, on the type of product being made. Where the product is to be used as a soluble antacid, then, of course, only non-toxic physiologically acceptable polyols such as sugars can be employed. Particularly good results are obtained by the reaction of the aluminum compound with sorbitol, mannitol, sucrose, and fructose.

The basic moiety can be provided by various alkaline reacting agents such as sodium hydroxide, potassium hydroxide, sodium bicarbonate, sodium carbonate, dihydroxy aluminum sodium carbonate, ammonium hydroxide, sodium citrate, calcium hydroxide, triethanol amine, or sodium aluminate. The base supplies a cationic character which has been found necessary to solubilize and stabilize the complex ionically. The base also initiates the reaction of the aluminum source and the polyol in water. The base appears to be loosely associated with the complex and it is believed that it is not altered significantly from its starting molecular form.

The polyhydroxyl hydrocarbon should be soluble in water at least to the extent of about 1 gram per 100 milliliters of water at room temperature. The solutions can be evaporated to a glassy dry material. This can be powdered and redissolved in water.

The complexes of the present invention have several advantages over the more conventional aluminum compounds. For one, they are alkaline in solution. Aluminum salts which have previously been used for sizing, and for other textile treatments are acidic when dissolved in water.

The complexes of the present invention are easily hydrolyzed to aluminum hydroxide or alumina. Consequently, they can be applied in a water soluble form, whereby the aluminum compound achieves good penetration and is deposited by hydrolysis with a mild acid.

The complexes of the present invention are only slightly ionic. This represents an advantage over other water soluble aluminum compounds which are markedly ionic.

The following specific examples illustrate the preparation of some of the complexes of the present invention.

EXAMPLE 1

One mole of sodium hydroxide (40 gms.) was dissolved in water and was combined with 280 gms. of sorbitol (1 mole plus a 20 gm. excess) in the form of a 70% solution. Three moles of aluminum powder (80.91 gm.) were reacted, and enough water was added to provide 1000 gms. of solution. This solution had an aluminum content of 8% and a pH of 11.5.

EXAMPLE 2

The procedure of Example 1 was followed except that instead of 3 moles of aluminum powder, 4 moles were used, and the solution total was 1100 gms. The solution produced had an aluminum content of 9.75%, and a pH of 11.3. It had a USP acid consuming capacity of 78 ml. of 0.1 N HCl per ml. of solution after one hour.

EXAMPLE 3

The same procedure was followed as in Example 1, except that 5 moles of aluminum powder were used, and the final weight of solution was 1500 gms. The solution which was produced had an aluminum content of 8.64%, and a pH of 11.3. It had an acid consuming capacity of 52.70 m.l of 0.1 N HCl per 1 ml. of solution after one hour.

EXAMPLE 4

The same procedure was followed as in Example 1 except that 6 moles of aluminum powder were added, and the final weight of solution was 2000 gms. This solution had a pH of 11.2 and an acid consuming capacity of 77.9 ml.

The complexes of Examples 1 through 4 can also be prepared by using sodium aluminate in place of sodium hydroxide, in which case one less mole of aluminum powder is required.

The complexes of Examples 1 to 3 can be prepared by using aluminum isopropylate instead of aluminum powder, followed by boiling off the isopropyl alcohol formed.

EXAMPLE 5

One mole plus 20 gms. excess (280 gm.) of 70% sorbitol was mixed with a solution of 30 grams of sodium hydroxide in 1000 ml. of water. Three moles (81 gm.) of aluminum powder were added in increments to this solution, and reacted. Sufficient water was added to obtain 1000 gm. of solution upon completion of the reaction. This solution had an aluminum content of 7.9% and a pH of 11.2.

EXAMPLE 6

0.33 mole of sodium citrate (98 gms.) in 1000 ml. of water were combined with 1 mole plus a 20 gm. excess of sorbitol and 3 moles of aluminum powder, heated and reacted, and adjusted with water to 1000 gm. of solution. This solution had an aluminum content of 8.0% and a pH of 9.45.

When the materials of the present invention are to be used as antacids, sometimes it is desirable to add buffering agents to bring the pH of the resulting solution into a range of 6.5 to 9.0. The following examples, Nos. 7–10, illustrate the preparation of this type of composition.

EXAMPLE 7

A ⅓ mole portion of sodium citrate (98 gms.) and 1 mole of sorbitol (260 gms. of a 70% solution) were added to 100 ml. of water and then 3 molecular proportions of aluminum powder (81 gms.) were added and reacted to form an aluminum sorbitate citrate complex. The complex was then combined with ⅙ mole of citric acid in 100 ml. of water. After cooling, the mixture was filtered and adjusted to 1000 gms. with water.

This solution had a pH of 8.55, and an aluminum content of 7.5%–7.8%, and an acid consuming power of 53 ml. 0.1 N HCl per ml. of solution.

EXAMPLE 8

In this example, 1 mole of sodium hydroxide (40 gms.) was reacted with 1 mole of sorbitol and 3 molecular proportions of of aluminum to produce a solution of sodium aluminum sorbitate complex. After adjustment to 1000 gms. with water, there was added, for buffering, ½ mole of dihydroxy aluminum gluconate (137 gms.) dissolved in 200 ml. of water. This solution had a pH of 8.51, and an aluminum content of 6%, and an acid consuming power of 44 ml. 0.1 N HCl per ml. of solution.

EXAMPLE 9

2800 gms. of 70% sorbitol solution were mixed with a solution of 10,000 ml. of water and 400 gms. of sodium hydroxide at 33° C. The reaction was started with 35 moles (945 gms.) of aluminum powder and the temperature was held so as not to exceed 95° C. The reaction time was 5.5 hours. The solution was filtered through Celite after cooling and 5 moles of glucono delta lactone (900 gms.) were added with rapid stirring. The solution was adjusted with water to a weight of 13,500 gms. The resulting composition was a sodium aluminum sorbitate complex buffered with ½ mole of gluconic acid.

EXAMPLE 10

2800 gms. of 70% sorbitol in a solution of 10,000 ml. of water and 400 gms. of sodium hydroxide were mixed at 33° C. The reaction was started with 30 moles of aluminum powder and the temperature was maintained at a value not over 95° C. for 5 hours. The solution was filtered through Celite after cooling and 5 moles of citric acid were slowly added with rapid stirring. The solution (about 2 liters) was heated and vacuum evaporated to 11,000 gms. in weight. The material which resulted was a sodium hydroxyaluminum sorbitate complex buffered with citric acid.

EXAMPLE 11

One mole of sodium hydroxide and 1 mole of sucrose in 900 ml. of water were reacted with 2 moles of aluminum powder. The reaction started immediately and was cooled to keep temperatures at or below 90° C. The resulting product was filtered and adjusted to 1000 gms. of solution, which was brownish yellow in color. This solution analyzed 5.1% aluminum and had a pH of 11.5.

EXAMPLE 12

One mole of sodium hydroxide and 1 mole of sucrose in 1000 ml. of water were reacted with 3 moles of aluminum powder. The reaction was exothermic and was cooled to maintain a temperature of 90 to 94° C. The product was filtered and adjusted to 1000 gms. of solution. The product analyzed 7.85% aluminum and had a pH of 11.5.

EXAMPLE 13

One mole plus a 20 gm. excess of a sorbitol solution plus 84 gms. of sodium bicarbonate in 1000 ml. of water were carefully reacted with 3 moles of aluminum powder. It was necessary to heat the solution for a short time to start the reaction. The solution was filtered and adjusted to 1200 gms. with water. The solution analyzed 6.31% aluminum, 1.2% carbon dioxide and had a pH of 11.4.

EXAMPLE 14

One-mole plus a 20 gm. excess of sorbitol solution and 84 gms. of sodium bicarbonate in 1000 ml. of water were carefully reacted with 4 moles of aluminum powder. It was necessary to heat the reaction mixture to start the reaction. An additional 500 ml. of water was added at the end of the reaction to decrease the viscosity to a workable level. The solution was adjusted to 2000 gms. with water. This solution analyzed 5.38% aluminum, 0.73% carbon dioxide, and had a pH of 11.2. The acid consuming capacity of the solution was 44.34 ml. of 0.1 N HCl per ml. solution.

EXAMPLE 15

One mole (182.2 gms.) of mannitol were mixed with a solution of 40 gm. of sodium hydroxide in 1000 ml. of water and reacted slowly with 4 moles of aluminum powder. The reaction resulted in the evolution of hydrogen. The temperature was kept at 100° C. The solution was filtered but was very viscous. The solution was adjusted to 1200 gm. with water. It analyzed 8.9% aluminum and had as pH of 11.4.

EXAMPLE 16

One mole of mannitol was mixed with a solution of 40 gm. of sodium hydroxide in 1000 ml. of water and reacted slowly with 3 moles of aluminum powder. Hydrogen was evolved, and the temperature was kept at 98° C. The solution was filtered and adjusted to 1000 gms. of solution weight with water. The solution analyzed 7.8% aluminum and had a pH of 11.5.

EXAMPLE 17

One mole of sodium aluminate with a 3 gm. excess was added to water in combination with 280 gms. of a 70% sorbitol solution. The materials were mixed and reacted with 3 moles of aluminum powder, resulting in a very exothermic reaction. The temperature was maintained at 96 to 98° C. The solution was filtered and adjusted to 1000 gms. of solution with water. It analyzed 8.2% aluminum and had a pH of 11.2.

EXAMPLE 18

One mole of sodium hydroxide (40 gm.) was dissolved in 1000 ml. of water and combined with one mole plus 20 gm. excess (280 gm.) 70% sorbitol solution. Three moles of warm liquid aluminum isopropylate (612 gms.) were added in a small stream under conditions of rapid stirring. The isopropyl alcohol that was released was removed by heating and evaporation. Water was added to make 1000 gm. of solution. The solution had an aluminum content of 8% and a pH of 11.5.

EXAMPLE 19

The same reaction was carried out as in Example 18, except 4 moles of aluminum isopropoxide (816 gm.) were used. Weight of the final solution was 1100 gm. The aluminum content was 9.4% and the pH was 11.3.

The solubility of the compounds of the present invention varies, of course, from one to another. The greater the ratio of aluminum to carbon attached hydroxyls, the less soluble is the complex.

The pH of the solutions of the complexes, in quantities ranging from 20 to 40% by weight, may range from about 6.5 to 11.8. These complexes generally precipitate out when the pH is dropped to a range of 2.5 to 5.5.

All of the complexes which we have prepared have a solubility of at least 1 gm. of the material per 100 ml. of water, and many of them are soluble to the extent of 50% by weight. Some materials are soluble in even higher concentrations but usually the viscosities involved are very high.

It should be understood that various modifications can be made to the described embodiments without departing from the scope of the present invention.

I claim as my invention:

1. A water soluble aluminum-polyhydroxyl hydrocarbon complex having the formula $$A_n + [Al(OH)_3]_x R(OH)_y]$$

where A is a pharmaceutically acceptable base, $R(OH)_y$ is a water soluble polyhydroxyl hydrocarbon selected from the group consisting of sugars and sugar alcohols, $x$ has a value from 0.1 to $y$, $y$ is the hydroxyl on the hydrocarbon and is an integer of at least 2, and $n$ is from 0.1 to 2, said complex having a pH of from 6.5 to 11.8 in a 20 to 40% by weight aqueous solution.

2. The complex of claim 1 in which $R(OH)_y$ is a sugar.
3. The complex of claim 1 in which $R(OH)_y$ is sorbitol.
4. The complex of claim 1 in which $R(OH)_y$ is sucrose.
5. The complex of claim 1 in which $R(OH)_y$ is mannitol.
6. The complex of claim 1 in which A is sodium citrate.
7. The complex of claim 1 in which A is sodium hydroxide.

References Cited

UNITED STATES PATENTS

| | | | |
|---|---|---|---|
| 3,173,934 | 3/1965 | Davison | 260—209 |
| 3,198,332 | 8/1965 | Davison | 260—209 |
| 3,432,489 | 3/1969 | Nitta et al. | 260—209 |

LEWIS GOTTS, Primary Examiner

J. R. BROWN, Assistant Examiner

U.S. Cl. X.R.

106—25, 287 R; 252—8.9, 175, 316; 260—448 R